US009565363B1

(12) United States Patent
Hatao et al.

(10) Patent No.: US 9,565,363 B1
(45) Date of Patent: Feb. 7, 2017

(54) STABILIZATION OF CAPTURED IMAGES FOR TELEOPERATED WALKING BIPED ROBOTS

(71) Applicant: Google Inc., Mountain View, CA (US)

(72) Inventors: Naotaka Hatao, Tokyo (JP); Takashi Ogura, Tokyo (JP)

(73) Assignee: X Development LLC, Mountain View, CA (US)

( * ) Notice: Subject to any disclaimer, the term of this patent is extended or adjusted under 35 U.S.C. 154(b) by 65 days.

(21) Appl. No.: 14/822,483

(22) Filed: Aug. 10, 2015

(51) Int. Cl.
*G06K 9/00* (2006.01)
*H04N 5/232* (2006.01)
*H04N 13/02* (2006.01)
*G01B 11/14* (2006.01)
*G06T 7/00* (2006.01)

(52) U.S. Cl.
CPC .......... H04N 5/23248 (2013.01); G01B 11/14 (2013.01); G06T 7/0075 (2013.01); H04N 5/23293 (2013.01); H04N 13/0203 (2013.01); G06T 2207/10012 (2013.01); G06T 2207/30108 (2013.01)

(58) Field of Classification Search
CPC .......... H04N 5/23248; H04N 13/0203; H04N 5/23293; G06T 7/0075; G06T 2207/30108; G06T 2207/10012; G01B 11/14
USPC ........... 382/153, 154; 348/348, 208.1, 208.4, 348/208.6, 208.99; 700/245, 259, 264
See application file for complete search history.

(56) References Cited

U.S. PATENT DOCUMENTS

| | | | |
|---|---|---|---|
| 6,985,619 B1* | 1/2006 | Seta | G06K 9/00798 345/419 |
| 7,327,112 B1 | 2/2008 | Hlynka et al. | |
| 7,398,136 B2 | 7/2008 | Higaki et al. | |
| 8,134,604 B2* | 3/2012 | Fujita | H04N 5/145 348/208.6 |
| 8,508,651 B2 | 8/2013 | Tsubaki et al. | |
| 2002/0018070 A1* | 2/2002 | Lanier | G06F 3/14 345/629 |
| 2004/0057613 A1* | 3/2004 | Noto | G06T 7/0073 382/154 |
| 2004/0101162 A1* | 5/2004 | Higaki | G01C 11/00 382/103 |

(Continued)

FOREIGN PATENT DOCUMENTS

WO 0201856 A1 1/2002

*Primary Examiner* — Samir Ahmed
(74) *Attorney, Agent, or Firm* — McDonnell Boehnen Hulbert & Berghoff LLP

(57) ABSTRACT

An example method for stabilizing images involves obtaining an image of an environment from a perspective of the robot. The method also involves receiving one or more depth measurements. The depth measurements correspond to locations within the image. The method further involves determining first boundaries around a particular location within a section of the image. The particular location is approximately centered within the first boundaries. Additionally, the method involves determining an extent of deviation of a particular position of the image capture device from a reference position. The particular position is a position of the image capture device at a point in time at which the image was captured. Further, the method involves determining second boundaries by shifting the first boundaries by an amount proportional to the determined extent of deviation. The method additionally involves providing, to a display device, a portion of the image defined by the second boundaries.

20 Claims, 13 Drawing Sheets

(56) References Cited

U.S. PATENT DOCUMENTS

| | | | | |
|---|---|---|---|---|
| 2004/0104935 | A1* | 6/2004 | Williamson | G06F 3/012 |
| | | | | 715/757 |
| 2004/0193323 | A1* | 9/2004 | Higaki | G06N 3/008 |
| | | | | 700/259 |
| 2008/0246848 | A1* | 10/2008 | Tsubaki | G06T 7/20 |
| | | | | 348/208.4 |
| 2011/0244958 | A1* | 10/2011 | Nimura | H04N 13/0239 |
| | | | | 463/31 |
| 2013/0044227 | A1* | 2/2013 | Uehara | G02B 7/38 |
| | | | | 348/208.1 |
| 2013/0114886 | A1* | 5/2013 | Kotake | G01B 11/002 |
| | | | | 382/154 |
| 2013/0242122 | A1* | 9/2013 | Toyoda | G06T 11/00 |
| | | | | 348/208.6 |
| 2014/0371912 | A1 | 12/2014 | Passot et al. | |

* cited by examiner

STABILIZATION OF CAPTURED IMAGES FOR TELEOPERATED WALKING BIPED ROBOTS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to stabilization of images captured by a robot. One example involves obtaining, from an image capture device coupled to a robot, an image of an environment from a perspective of the robot. The example also involves receiving, from a depth sensor coupled to the robot, one or more depth measurements. The depth measurements correspond to locations within the image. The depth measurements are indicative of distances between the image capture device and a surface in the environment. The example further involves determining first boundaries around a particular location within a section of the image. The particular location corresponds to a particular depth measurement of the one or more depth measurements. The particular location is approximately centered within the first boundaries. Additionally, the example involves determining an extent of deviation of a particular position of the image capture device from a reference position. The particular position is a position of the image capture device at a point in time at which the image was captured. Further, the example involves determining second boundaries by shifting the first boundaries by an amount proportional to the determined extent of deviation. The example additionally involves providing, to a display device, a portion of the image defined by the second boundaries.

Another example describes a system. The system includes a viewing apparatus and a processing device. The viewing apparatus includes an orientation sensor and a display device. The orientation sensor is configured to measure an angular position of the viewing apparatus. The display device is configured to display images. The processing device is configured to execute a set of instructions. The instructions include selecting a section of an image based on the angular position of the viewing apparatus at a point in time at which the image was captured. The image was captured by an image capture device coupled to the robot. The instructions also include determining first boundaries around a particular location within the section of the image corresponding to a particular depth measurement of a plurality of depth measurements recorded by a depth sensor coupled to the robot. The instructions further include determining an extent of deviation of a particular position of the image capture device from a reference position. The particular position is a position of the image capture device at a point in time at which the image was captured. Additionally, the instructions include determining second boundaries by shifting the first boundaries by an amount proportional to the determined extent of deviation. Further, the instructions include causing the display device to display a portion of the section of the image defined by the second boundaries.

In still another example, the present application describes a non-transitory computer-readable medium having stored thereon instructions that, upon execution by at least one processor, cause a computing device to perform a set of operations. The operations include obtaining, from an image capture device coupled to a robot, an image of an environment from a perspective of the image capture device. The operations also include receiving, from a depth sensor coupled to the robot, a plurality of depth measurements, wherein depth measurements correspond to locations within the image. The depth measurements are indicative of distances between the image capture device and a surface in the environment. The operations further include determining first boundaries around a particular location within a section of the image. The particular location corresponds to a particular depth measurement of the one or more depth measurements. The particular location is approximately centered within the first boundaries. Additionally, the operations include determining an extent of deviation of a particular position of the image capture device from a reference position. The particular position is a position of the image capture device at a point in time at which the image was captured. Further, the operations include determining second boundaries by shifting the first boundaries by an amount proportional to the determined extent of deviation. The operations additionally include providing data representative of a portion of the section of the image defined by the second boundaries to a teleoperation device.

In yet another example, the present application describes a system. The system includes a means for obtaining, from an image capture device coupled to a robot, an image of an environment from a perspective of the robot. The system also includes a means for receiving, from a depth sensor coupled to the robot, one or more depth measurements. The depth measurements correspond to locations within the image. The depth measurements are indicative of distances between the image capture device and a surface in the environment. The system further includes a means for determining first boundaries around a particular location within a section of the image. The particular location corresponds to a particular depth measurement of the one or more depth measurements. The particular location is approximately centered within the first boundaries. Additionally, the system includes a means for determining an extent of deviation of a particular position of the image capture device from a reference position. The particular position is a position of the image capture device at a point in time at which the image was captured. Further, the system includes a means for determining second boundaries by shifting the first boundaries by an amount proportional to the determined extent of deviation. The system additionally includes a means for providing, to a display device, a portion of the image defined by the second boundaries.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
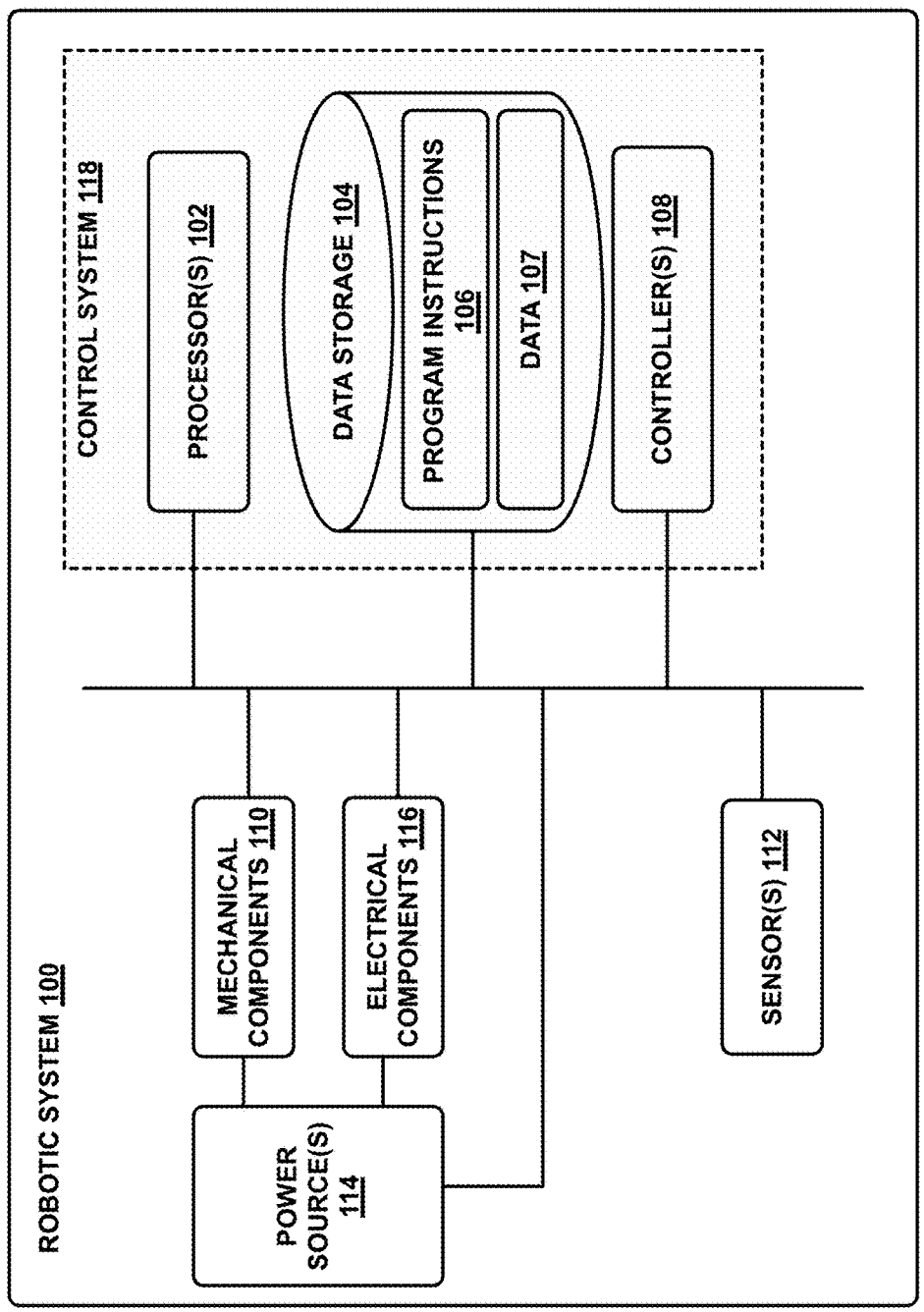
FIG. 1 illustrates a configuration of a robotic system, according to an example implementation.

The following detailed description describes various features and operations of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Overview

The present application discloses implementations that relate to stabilization of images. A camera or other image capture device may captured a series of images over a period of time to form a video. In some circumstances, a camera may be fixed or is otherwise stable, such that each image in the video is captured from substantially the same perspective (or the perspective changes smoothly between sequentially captured images). However, in other circumstances, a camera may move about in an erratic, irregular, or unstable manner, such that images in the video are captured from varying perspectives. When these images are sequentially displayed for viewing, the resulting video may appear to be shaky, jittery, and/or unstable due to the camera's change in position while the images were captured. Such video may cause discomfort to the viewer.

In some instances, a robot may include one or more appendages for locomotion and be equipped with a camera for capturing images and/or video from the perspective of the robot. During operation, the robot's locomotion may be turbulent, causing the camera to shake or move about as it captures images. When the resulting video is displayed, it may be difficult to view the video or observe a particular subject within the video.

An example implementation involves stabilizing one or more images around a particular object present within those images. The image stabilization technique of the present application involves selecting an object within the image and determining boundaries around the object such that the object is approximately centered within those boundaries. Then, the technique involves shifting those boundaries by some amount based on the state of the robot when the image was captured. The shifted boundaries define the portion of the image that is then displayed on a display device.

Determining how much to shift the boundaries may be based a position of the camera when the image was captured relative to a reference position. For example, a reference position for a biped robot may be a position of the camera when the robot's two feet are together and the robot is standing still. As the robot walks, the camera may sway laterally and/or vertically due to the robot's gait. The amount by which to shift the boundaries may be proportional to the lateral and/or vertical displacement of the camera when the image was captured compared to the reference position. This amount of displacement may be referred to herein as an "extent of deviation" of the position of the image capture device from the reference position.

In some instances, the object around which to stabilize the images may be selected based on depth information recorded by a depth sensor coupled to the robot. The depth sensor may record a set of depth measurements that correspond to surfaces or objects within the image. In some implementations, the selected object corresponds to depth measurements indicating that the object is in the foreground of the image. In some implementations, the selected object may be the object with a corresponding depth measurement that is the smallest among the set of depth measurements.

In some implementations, the user may operate the robot remotely using a virtual reality headset. The headset may include a display device and an orientation sensor indicative of an angular position of the headset. A computing device may receive an orientation measurement from the headset, and use this orientation measurement as a basis for selecting a section of the image with which to perform the image stabilization techniques of the present application. For example, if the user wearing the headset looks down and to the left, a bottom left section of the image may be used for the remainder of the image stabilization operations. By selecting a section of the image based on the headset orientation, the teleoperator may "virtually tilt" the camera. A user or teleoperator may view the stabilized images on a viewing device or virtual reality headset, and instruct the robot to perform various movements or carry out various tasks. Such remote operation of robotic devices may be generally referred to herein as "teleoperation."

In some implementations, the camera of the robot may include a fisheye lens or other wide-angle lens that captures a distorted image of the scene. Such lenses may be desirable for capturing a large field-of-view of the robot's environment. In these implementations, the image stabilization technique may also involve transforming the image in order to remove the distortion.

Note that "images" and "video" may be used interchangeably herein to describe visual representations of a scene from the perspective of an image capture device. In some instances, a video may be comprised of two or more images. As referred to herein, an "image" may be an individual frame of a video. Thus, "image stabilization" may refer to the stabilization or modification of one or more frames within a video.

More specifically, "image stabilization" generally refers to an operation, process, or technique by which images may be cropped, positioned, oriented, or otherwise transformed based on information related to those images. In some cases, image stabilization techniques of the present application may reduce jitter or shakiness between successive images. The resulting images may or may not completely compensate for jitter or changes in a camera's pan or tilt between successive images. As described herein, the term "image stabilization" may be used to describe a technique for determining the manner in which to crop, position, orient, or otherwise transform an image based on information relating to the state of a robot and/or the states of other devices.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
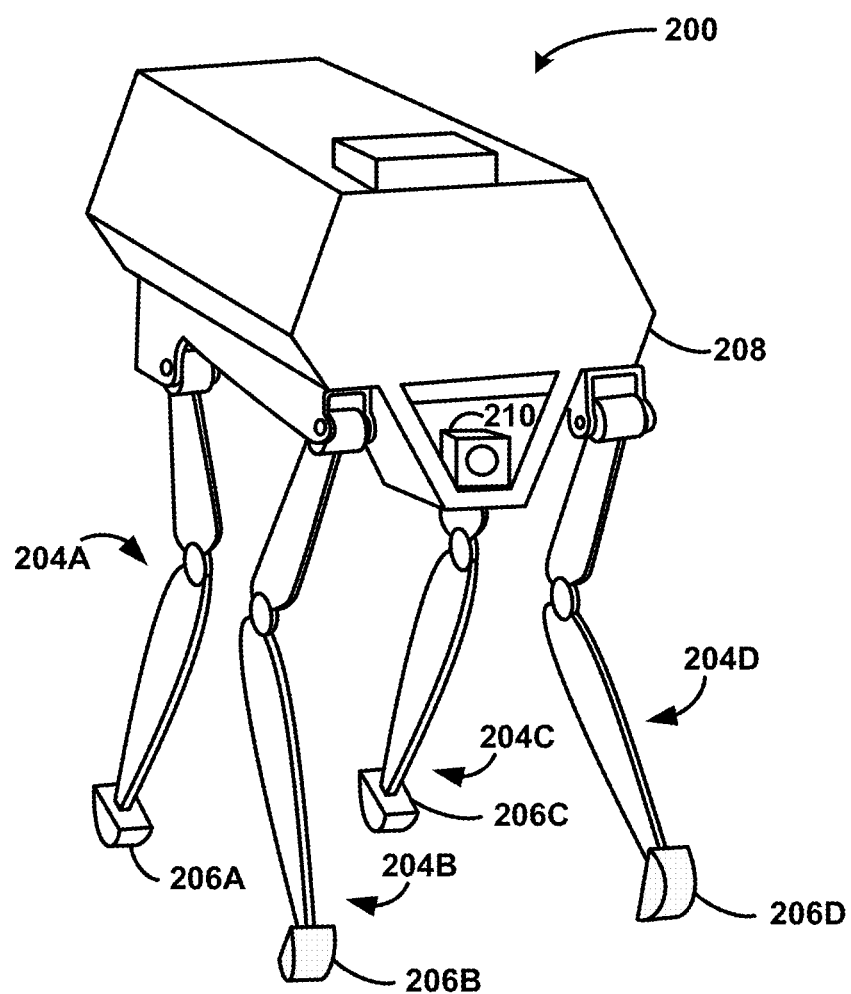
FIG. 2 illustrates a perspective view of a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
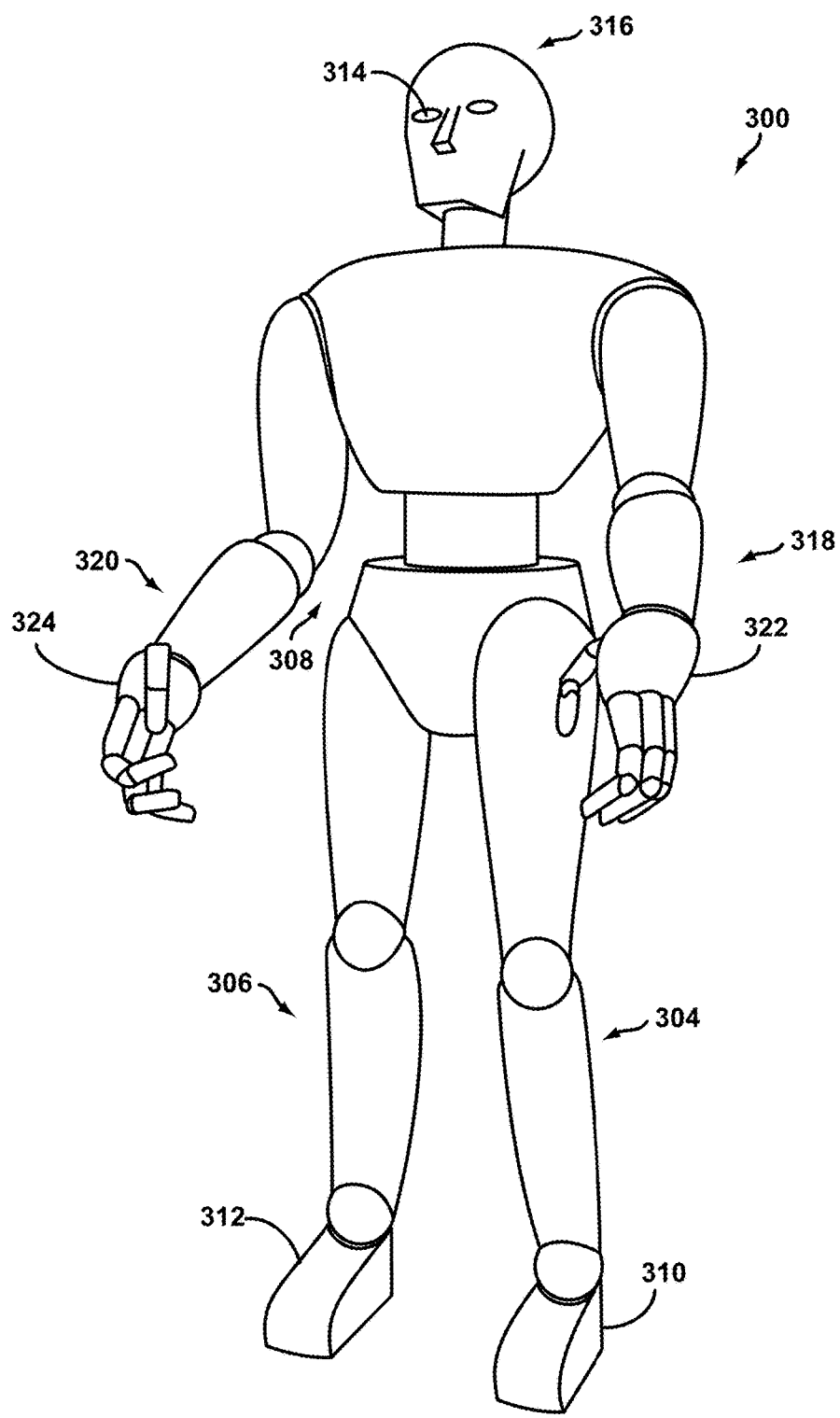
FIG. 3 illustrates a perspective view of a biped robot, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. Example Systems

Figure 4:
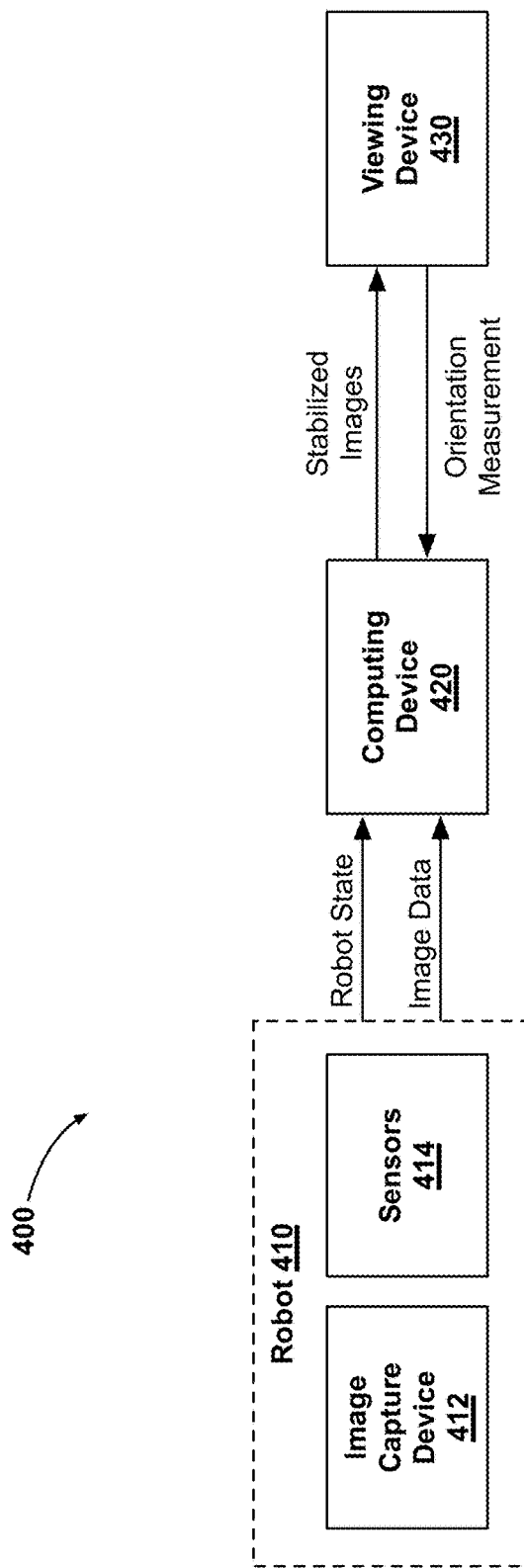
FIG. 4 is a schematic block diagram of a system, according to an example implementation.

FIG. 4 is a schematic block diagram of a system 400, according to an example implementation. The system 400 depicted in FIG. 4 is an example system in which image stabilization techniques of the present application may be performed. The system 400 includes a robot 410, computing device 420, and viewing device 430. The robot 410 includes an image capture device 412 and sensors 414, among other possible units, devices, and/or other components. The robot 410 is communicatively coupled to the computing device 420. Additionally, the computing device 420 is communicatively coupled to viewing device 430.

In system 400, using image capture device 412, the robot 410 captures image data representative of a scene or environment proximate to the robot 410. The image capture device 412 may be any device capable of sensing, capturing, or otherwise recording data representative of a two-dimensional depiction of a scene or environment. Some example image capture devices include cameras, LIDAR devices, RADAR devices, and SONAR devices. The image capture device 412 may be mounted, fixed, or otherwise attached to the robot 410 at a known position on a component of the robot 410, such as the robot's body.

Using sensors 414, the robot 410 also records sensor information indicative of a state of the robot 410. These sensors may measure the angles of various joints of the robot 410. The sensors may also capture kinematic and/or inertial information about the robot's orientation, angular velocity, position, translational velocity, and/or acceleration, among other kinds of information. Collectively, the sensor information gathered by sensors 414 may be used by a computing device or other system to determine the position of the image capture device 412. For example, the joint angle measurements may be applied to a model of the robot 410, such that a particular set of angles may correspond to a position and orientation of the robot's camera.

Additionally, the sensors 414 may include a depth sensor configured to capture depth information of the scene or environment proximate the robot 410. The depth information captured by the depth sensor may be spatially mapped to locations within the scene, such that a given location within a scene may have a corresponding pixel or portion of the image, along with a corresponding depth measurement of that object, surface, or feature within the scene. The depth sensor may be mounted, fixed, or otherwise coupled to the robot 410 at a known position on a component of the robot 410, such as the robot's body. Further, the relative positions of the depth sensor and the image capture device 412 may be known, such that depth information relative to the depth sensor can be transformed to indicate depth information relative to the image capture device 412.

Each pixel in a captured image may be associated with a depth measurement. In some instances, the depth sensor may record depth information having the same spatial resolution as the image; in these instances, each depth measurement may be mapped to a single pixel. In some cases, the depth sensor may record depth information at a lower spatial resolution compared than the image; in these cases, a given depth measurement may correspond two or more pixels in the image.

The robot 410 may also include thereon a control system, actuators, appendages, and/or an information processing device. The information processing device may process information captured by the image capture device 412 and/or sensors 414 in order to generate data to be used by the computing device 420. For example, the sensors 414 may record raw information about the angles of various joints of the robot 410. The information processing device may process those joint angle measurements in order to determine the position of the robot's body, image capture device 412, and/or depth sensor, among other possible determinations. The processed sensor data may collectively be referred to as the "robot state." The robot 410 may then transmit the robot state and image data to the computing device 420.

The computing device 420 may be any kind of information processing device capable of carrying out operations for performing image stabilization techniques of the present application. The computing device 420 may use the robot state as a basis for cropping, transforming, or otherwise modifying the image data in order to generate one or more stabilized images. The computing device 420 may then transmit the stabilized images to the viewing device 430 to be displayed.

The viewing device 430 may be any apparatus with which a user or teleoperator may view the stabilized images generated by computing device 420. The viewing device 430 may include a display device, such as a liquid crystal display (LCD), an organic light emitting diode (OLED) display, an active-matrix OLED (AMOLED), among other possible display devices. The viewing device 430 may also include mounting straps or other hardware used to fix the viewing device 430 to a user's or teleoperator's head. An example wearable viewing device 430 may be a wearable virtual reality headset.

The viewing device 430 may also include an orientation sensor—such as a gyroscope or inertial measurement unit (IMU)—that measures an angular position of the viewing device 430. In some implementations, the orientation sensor measures the orientation of the viewing device 430 relative to a reference position; in other implementations, the orientation sensor measures a change in the angular position of the viewing device 430 over time. Regardless of the particular implementation, the viewing device 430 may transmit its orientation (or change in orientation) to the computing device 420.

The computing device 420 may use the orientation measurement of the viewing device 430 as a basis for selecting a section of the image on which to perform image stabilization techniques. For example, if a teleoperator wearing the viewing device 430 turns his or her head up and to the right, an upper-right section of the image may serve as a basis for image stabilization.

The viewing device 430 is one example device on which the stabilized images can be displayed. Other display devices or other computing devices may also be used to display the stabilized images. For example, a user or teleoperator may view the stabilized images on a computer monitor or television, and control the robot using a control column, joystick, gamepad, or other input device. Thus, the present application is not limited to virtual reality headsets, but can include other display devices alternatively or additionally.

The example system 400 depicted in FIG. 4 is provided for explanatory purposes. Other systems having fewer or more units or devices may also be used to perform various aspects of the present application. Additionally, devices within the system 400, such as robot 410, may include fewer or more components configured in a variety of ways. Operations, processes, and actions of the present application may be performed on any of the robot 410, the computing device 420, the viewing device 430, and/or any other device that may possibly be included within system 400.

IV. Example Virtual Camera Orientation

Figure 5:
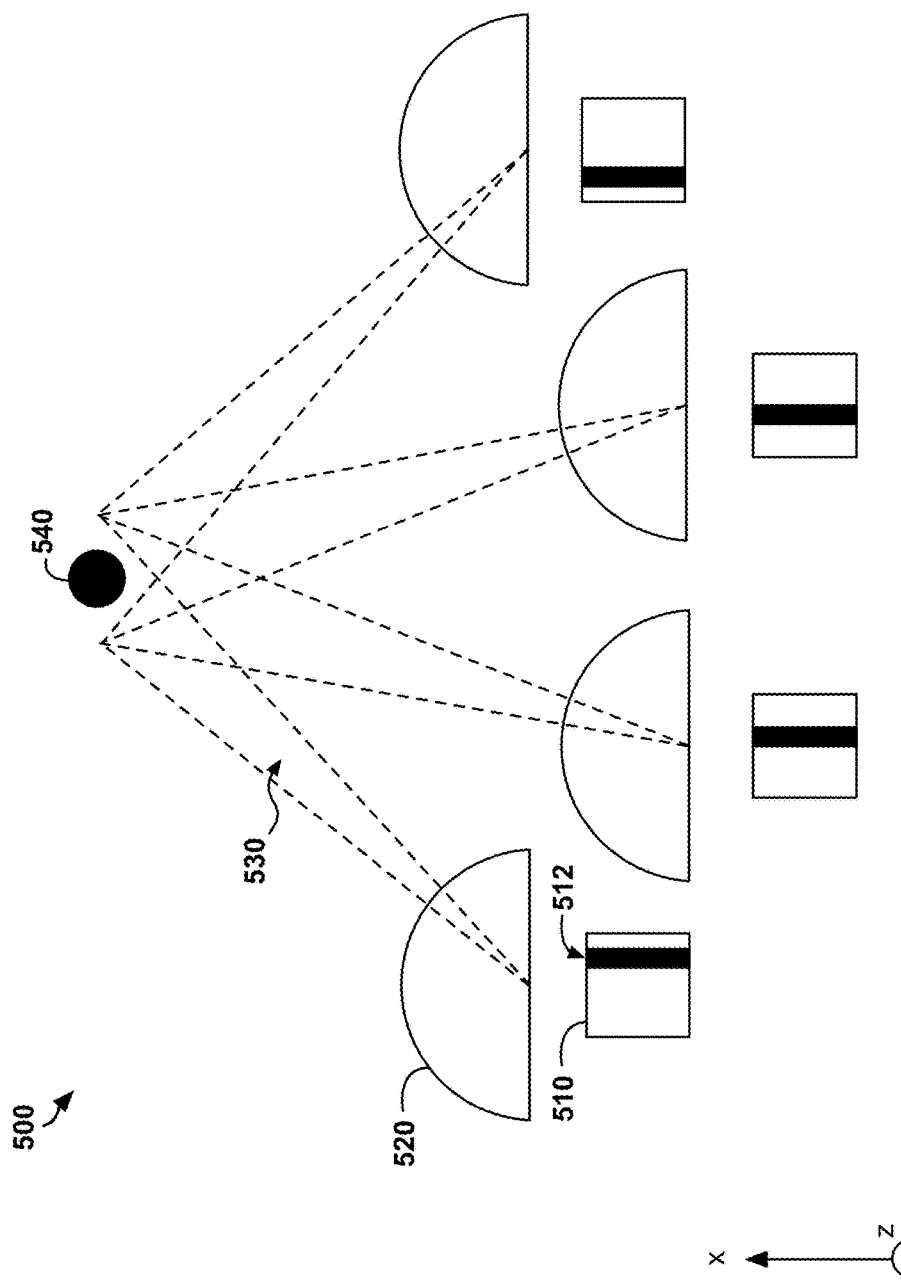
FIG. 5 is a conceptual illustration of virtual camera orientations, according to an example implementation.

FIG. 5 is a conceptual illustration 500 of virtual camera orientations, according to an example implementation. Conceptual illustration 500 depicts a camera at four different positions relative to the object 540. The dotted lines represent the angle-of-view of the camera at a given position that encompasses object 540.

An image captured by a camera coupled to a robot may represent an angle-of-view (or field-of-view) indicative of an angular extent of the scene. In some instances, the present application involves selecting a section of the full angle-of-view with which to perform image stabilization operations. The section of the image may represent a smaller angle-of-view indicative of a reduced angular extent of the scene. The section of the image may be determined based on an orientation of a virtual reality headset, for example.

In the conceptual illustration 500, a top-down view of a camera lens at four different positions is depicted. As shown in the conceptual illustration 500, the part of the scene containing the object 540 represents a different section of the image depending upon the perspective of the camera. At the far left, the camera 520 perceives the object 540 at an angle-of-view 530 that corresponds to a portion of the image 512. When the camera 520 is at its far left position, the object 540 appears to be on the right side of the image 510 (within portion 512). As the camera's position move to the right, the object 520 appears to be moving to the left within the image. When the camera is at its far right position, the object 540 appears to be on the left side of the image.

The present application involves centering an object— such as object 540—within a portion of the image 510. To accomplish this, a computing device may "virtually tilt" the camera in order to shift object 540 to the center of the image 510. In some implementations, the present application involves displaying only the portion 512 of the image 510 (or another portion of the image 510), rather than the entire image 510. As the camera physically pans from left to right, the object 540 appears to remain centered within the portion 512 of the image 510, despite the object 540 moving from the right side of image 510 to the left side of image 510. In this manner, a selected object such as object 540 may be "stabilized" across a series of images.

In some instances, the virtual camera tilt may be determined by tracking the object 540 across multiple images. However, this type of image processing-based tracking may be computationally intensive, and thus difficult to accomplish in real time or near-real time. Image stabilization techniques of the present application may determine this virtual camera tilt based on the position of the camera, rather than based on the perceived position of the object 540. For example, the camera 520 at the far left position may be at a position in the negative-y direction relative to a reference position (e.g., a position of the camera where the object 540 and the camera have the same y-position). Based on sensor information indicative of the state of the robot, the position of the camera can be determined. Then, based on the calculated position of the camera and the distance between the object 540 and the camera, a computing device may determine the virtual camera tilt used to select the portion 512 of the image 510.

Conceptual illustration 500 is provided for explanatory purposes only. The conceptual illustration 500 may not be drawn to scale. Additionally, conceptual illustration 500 depicts the virtual camera tilt as being used to select a vertical strip of the image based on a lateral position of the camera. The virtual camera tilt may also be used to select a horizontal strip of the image based on a vertical position of the camera. Further, the virtual camera tilt may be used to select a rectangular portion of the image based on a combination of the vertical position and the horizontal position of the camera.

V. Example Methods

Figure 6:
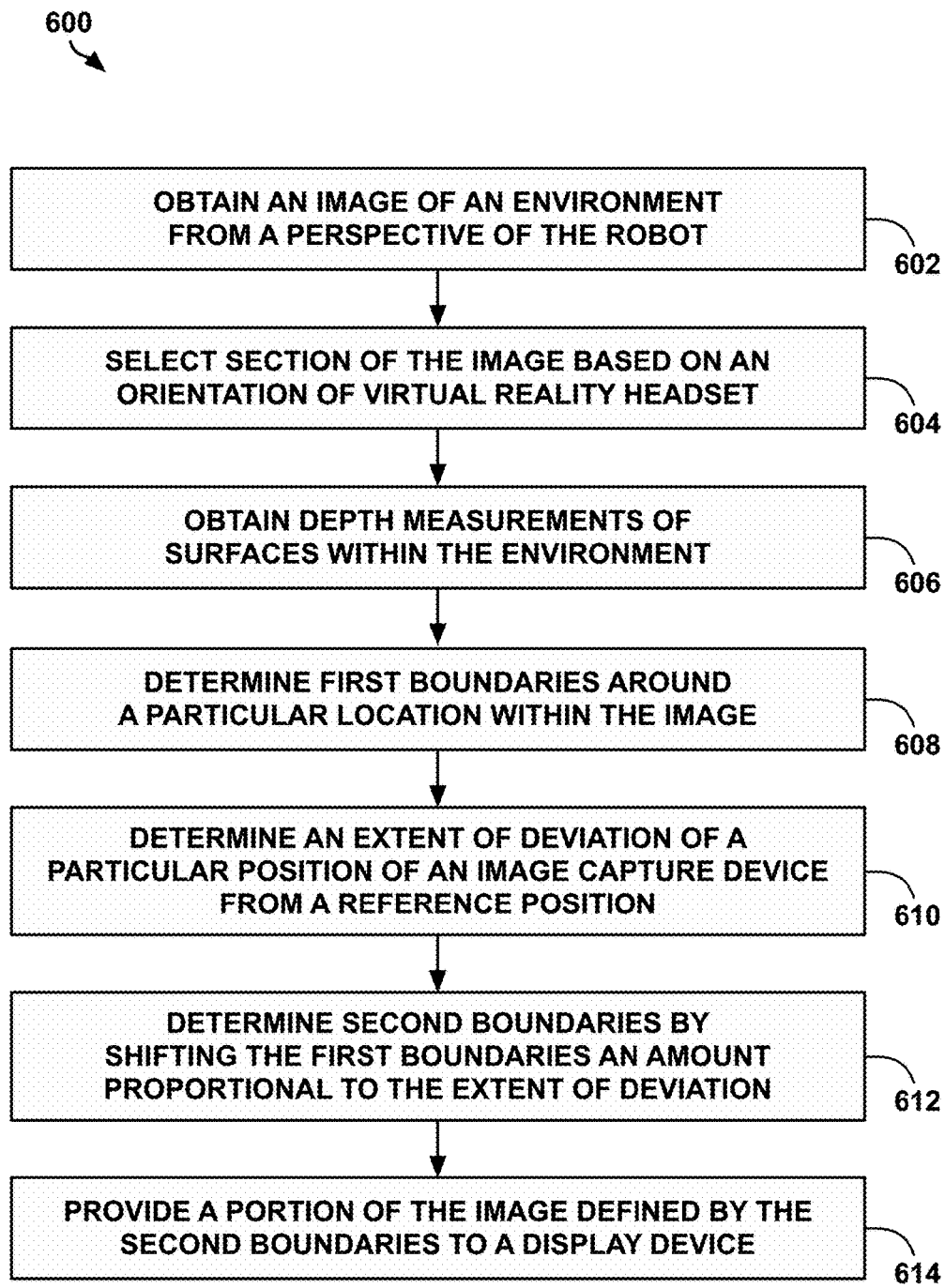
FIG. 6 is a flowchart, according to an example implementation.

FIG. 6 is a flowchart of operations 600 for stabilizing an image, according to an example implementation. Operations 600 shown in FIG. 6 presents an implementation that could be used by the computing device 420 of FIG. 4, for example, or more generally by other computing devices. Operations 600 may include one or more actions as illustrated by one or more of blocks 602-614. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 600 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one of more blocks in FIG. 6 may represent circuitry that is wired to perform the specific logical operations.

A. Obtain an Image of an Environment

Block 602 involves obtaining an image of an environment from a perspective of the robot. The robot may include an image capture device that captures an image having a first angle-of-view of an environment. The image capture device may be coupled to a body, torso, or head portion of the robot.

In some implementations, the image capture device may be a camera equipped with a fisheye lens (or other wide-angle lens). Such a lens may allow the camera to capture a large angular extent of the environment with a single image. Although wide-angle and fisheye lenses may produce images containing some distortion, the resulting image's large angle-of-view may capture more information about the robot's environment compared to a camera with a narrower field-of-view. Thus, the image may include objects of interest near the edges of the wide-angle image that would otherwise not be captured by a standard camera lens.

Images captured by wide-angle lensed camera provide a variety of benefits. For example, a user or teleoperator may only wish to observe a narrow angle-of-view of the scene, rather than the large angle-of-view represented by the full image. A section or portion of the image may be selected from within the full wide-angle image, representative of the desired narrower angle-of-view. In some instances, the section or portion of the image may then be transformed to remove distortion produced by the wide-angle lens. In this manner, a virtual camera having a narrower angle-of-view than the fisheye or wide-angle lensed camera may be simulated.

Applying the virtual narrow angle-of-view camera technique described above, a user or teleoperator may be able to virtually "tilt" or point the simulated narrow angle-of-view camera. For instance, a wide-angle image may represent an angle-of-view of 170° horizontally and 170° vertically, while a user or teleoperator may wish to only view an angle-of-view of 50° horizontally and 50° vertically. A 50° by 50° angle-of-view may be represented by a section of the full 170° by 170° angle-of-view image. By moving the boundaries that define the 50° by 50° angle-of-view section of the full image, a simulated tilting or pointing of a 50° by 50° angle-of-view camera can be achieved.

In implementations utilizing a wide-angle lensed camera, the operations 600 may also involve transforming the captured images to remove the distortion. One example transformation is known as a "fisheye to rectilinear" transformation. Such a transformation may be performed on the full image or only a section of the image, depending upon the particular implementation.

B. Select Section of the Image Based on an Orientation of Virtual Reality Headset Block 604 involves selecting a section of the image based on an orientation of a virtual reality headset. In some implementations, a user or teleoperator may view in real or near-real time images or video captured by the robot's image capture device. In some instances, the user or teleoperator may control the robot remotely, using these images or video in order to remotely perceive the environment surrounding the robot.

As described above, a display device may show a narrower angle-of-view than is captured by the full image. A virtual reality headset may be equipped with an orientation sensor—such as a gyroscope or inertial measurement unit (IMU)—that measures the angular positioning of the headset. As the user or teleoperator rotates his or her head, the orientation sensor may detect the head movement and transmit the orientation measurement to the computing device.

Then, the computing device may use that orientation measurement as a basis for selecting a section of the image that represents the area of the environment that the user wishes to view. For example, if the user wishes to virtually tilt the camera downward to view the ground in front of the robot's feet, the user may tilt his or her head downwards. The orientation measurement may transmit this downward tilt (i.e., downward pitch) angle to the computing device. The computing device may then select a section of the full image representative of the narrower angle-of-view on the lower portion of the full image.

Note that this operation of selecting of a section of the image based on an orientation measurement may or may not be performed, depending upon the particular situation. In some instances, stabilized images may be provided to a television or computer monitor for viewing, and no orientation measurement is sent to the computing device. In these instances, the image stabilization operations may be performed on the full image, rather than the section of the image. In other implementations, the section of the image may be selected from input instruments other than an orientation measurement, such as from a keyboard, a graphical interface for controlling the virtual camera tilt, a gamepad, and/or a joystick, among other input instruments.

C. Obtain Depth Measurements of Surfaces within the Environment

Block 606 involves obtaining depth measurements of surfaces within the environment. In some implementations, the robot may be equipped with a depth sensor that measures distances between the robot and various surfaces within the environment. The depth sensor may capture individual distance measurements, or may capture a set of distance measurements that are spatially mapped to surfaces within the environment. For the following description, the depth sensor of the robot captures a depth map containing a set of distance measurements that are mapped to particular locations within the captured image.

In some implementations, the computing device receives the depth map captured by the robot's depth sensor and selects a particular location in the environment around which the images are stabilized based on the depth map. As one example, the computing device may determine an object or surface within the environment that is nearest the robot (e.g., the smallest distance measurement within the depth map). Then, the computing device may determine the location within the image associated with that object or surface for use in the following image stabilization operations. This object may be referred to herein as the "focusing object."

In some implementations, the focusing object may be an object that is a predetermined distance from the robot at a given point in time. In other implementations, the focusing object may be an object that is at a particular height or nearest to a certain location at a given point in time. In further implementations, the focusing object may be manually selected by a user or teleoperator. The focusing object may also be selected autonomously based on a variety of other factors.

The depth sensor may be any sensor or device capable of measuring distances. Some example depth sensors include stereoscopic cameras, structured light cameras, and LIDAR devices, among other possible depth sensors.

D. Determine First Boundaries Around a Particular Location within the Image

Block 608 involves determining first boundaries around a particular location within the image. The particular location may be selected in a variety of ways. As described above, the particular location may be the location of the focusing object. The particular location may also be any other location within the image.

In implementations where the particular location is the location associated with the focusing object, the computing device may determine a location that represents the central point of the focusing object. Then, the computing device may determine the first boundaries positioned such that the particular location is centered (or approximately centered) within those first boundaries.

For the purposes of the present application, "boundaries" refer to dimensional constraints within the image that define a portion of the image. In some instances, boundaries may be rectangular defined by a set of four points within the image. Some example boundaries are illustrated in FIGS. 7A-7D.

In some implementations, the first boundaries have predetermined dimensions defined by, for example, the display resolution of a display device on which the stabilized images are displayed. The dimensions of the first boundaries may be defined in other ways as well.

E. Determine an Extent of Deviation of a Particular Position of an Image Capture Device from a Reference Position Block 610 involves determining an extent of deviation of a particular position of an image capture device from a reference position. Here, the computing device determines the extent to which the image capture device has moved or swayed in order to determine the appropriate way to compensate for the image capture device's motion. The particular position may be a position of the image capture device at a point in time at which the image was captured.

As the robot moves, the position of the image capture device's sways and moves about. As a result of this motion, two images captured at different points in time may correspond to two different perspectives. In order to counteract this motion, the computing device determines the extent to which the perspective has changed and adjusts the position of the first boundaries in order to compensate for this change in perspective.

Figure 8:
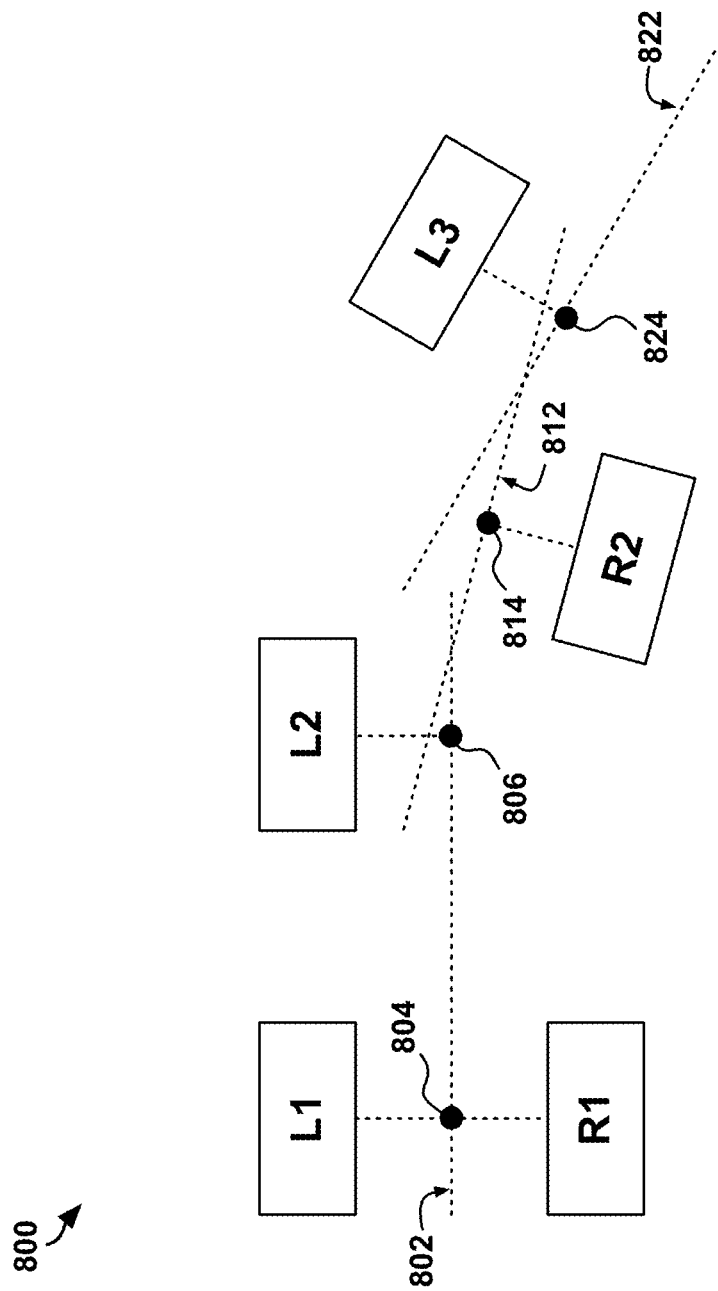
FIG. 8 illustrates a conceptual top-down view of a robotic step path, according to an example implementation.

In some implementations, the computing device first receives, obtains, or otherwise determines a reference position for the camera. In some instances, the reference position may be represented as a spatial position on a particular plane. For example, the reference position may be a position defined in two dimensions: the height of the image capture device when the robot is in a standing, default, or other reference posture; and a midpoint between the robot's two feet. Note that this is simply one way to define the reference position. A reference position may be any spatial position against which the position of the robot's image capture device can be compared to determine a relative perspective of an image captured by the image capture device at that position. An example technique for determining the reference position is illustrated in FIG. 8 and described in more detail below.

Then, the computing device determines the position of the image capture device at a point in time at which the image was captured. In some implementations, the computing device receives measurements from sensors coupled to the robot. The measurements may be indicative of the robot's position, velocity, acceleration, orientation, angular velocity, and/or angular acceleration, among other inertial measurements. The computing device may use the inertial measurements in order to calculate the spatial position of the robot's image capture device when the image was captured.

In other implementations, the computing device receives information indicative of a state of the robot. The information may include, for example, joint angle measurements. In these implementations, the computing device may apply the joint angle measurements to a known model of the robot (which may include sizes, dimensions, and configurations of various components of the robot) in order to determine the position of the robot's image capture device when the image was captured.

Regardless of how the position of the image capture device is determined, the computing device may then compare the two spatial positions in order to determine the extent to which the image capture device deviated from the reference position. In some implementations, the extent of deviation may be a combination of a horizontal displacement (if any) and a vertical displacement (if any). This extent of deviation may indicate an amount by which the image's perspective changed compared to an image captured by the image capture device at the reference position.

F. Determine Second Boundaries by Shifting the First Boundaries an Amount Proportional to the Extent of Deviation Block 612 involves determining second boundaries by shifting the first boundaries an amount proportional to the extent of deviation. Here, the computing device counteracts the change in perspective of the image capture device by shifting the first boundaries.

In some instances, shifting the boundaries may result in a change in the perspective of the virtual camera. As an example, consider a first image captured by the image capture device at the reference position (where the focusing object appears at the center of the first image) and a second image captured by the image capture device at a position to the left of the reference position (where the focusing object appears to the right of the center of the second image). The computing device may determine the extent of deviation to indicate a horizontal displacement to the left by some amount, which resulted in the focusing object appearing offset toward the right of the center of the second image. Based on the focusing object's distance from the robot and the measured horizontal displacement, the computing device can determine an amount to shift the second image in order to place the focusing object in the center of the second image. For instance, using trigonometric operations, an angle can be determined based on the measured distance to the focusing object and the horizontal displacement. This angle may be used to determine an amount to virtually "tilt" the camera in order to center the focusing object.

Applying the above-described technique, the computing device may determine second boundaries as the first boundaries shifted by some amount proportional to the extent of deviation.

G. Provide a Portion of the Image Defined by the Second Boundaries to a Display Device Block 614 involves providing a portion of the image defined by the second boundaries to a display device. In some instances, block 614 may involve transmitting data indicative of the portion of the image defined by the second boundaries to a virtual reality headset or other display device. This data transmission may be performed over a wired connection or over a wireless connection. In some implementations, block 614 may also involve instructing the display device to display the portion of the image.

VI. Additional Example Implementations

FIGS. 7A-7D depict aspects of above-described techniques for image stabilization. In each of the FIGS. 7A-7D, the left side of the figure depicts a conceptual perspective view of a camera 712 viewing an environment, while the right side of the figure illustrates the corresponding image captured by the camera 712 and/or boundaries defined within that image.

Figure 7A:
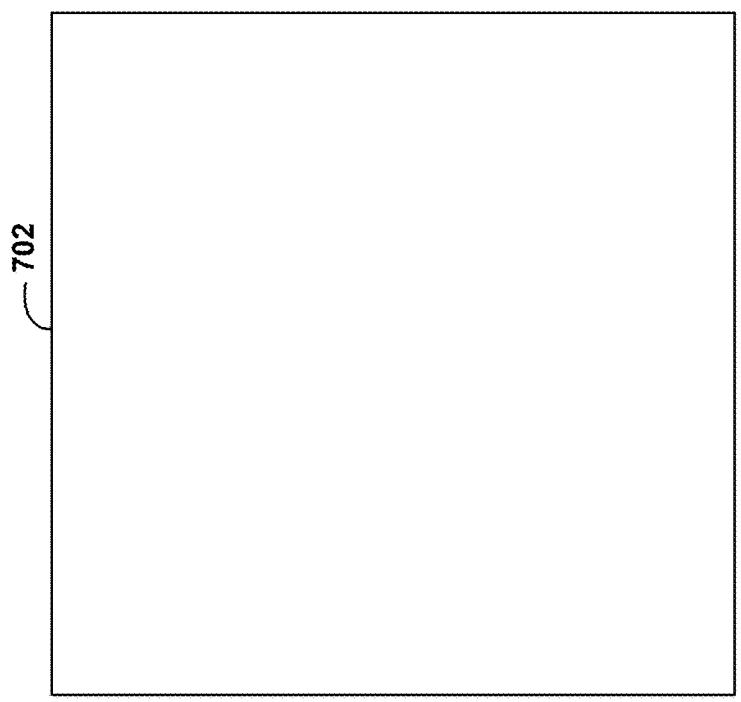
FIG. 7A illustrates a first aspect of an image stabilization process, according to an example implementation.
Figure 7A:
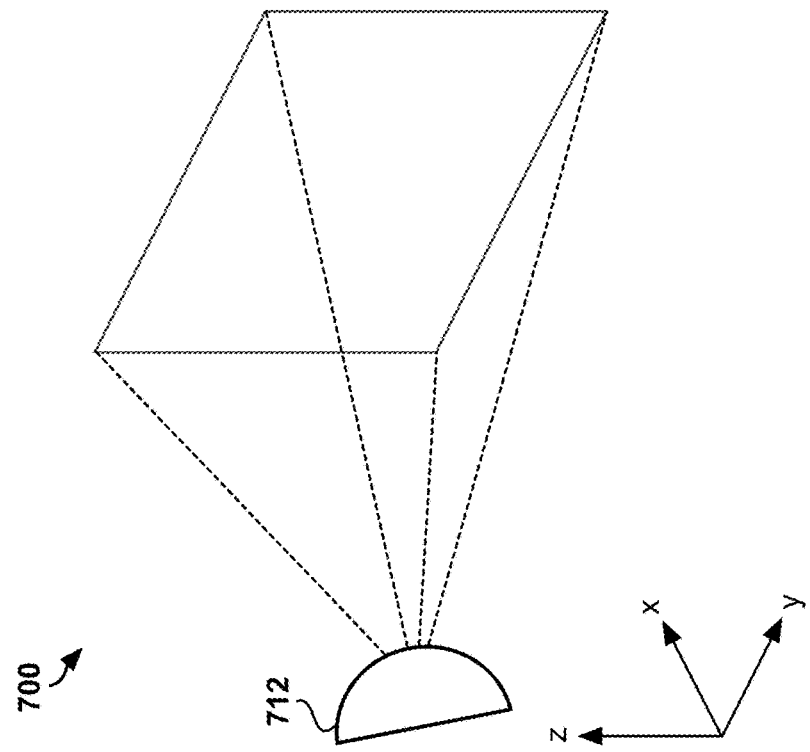

FIG. 7A illustrates a first aspect 700 of an image stabilization process, according to an example implementation. Step 700 may be similar to block 602 as described above. The dotted lines represent the angle-of-view captured by the camera 712. The solid lined rectangle represents a plane visible within the image captured by the camera 712. On the right side of FIG. 7A, the full image 702 is shown, which corresponds to the solid lined rectangle of the left side of the image.

Figure 7B:
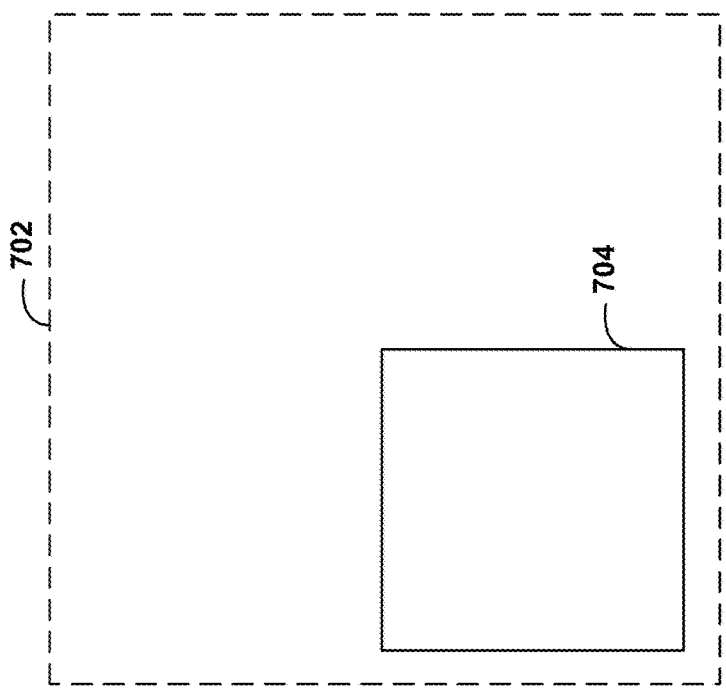
FIG. 7B illustrates a second aspect of an image stabilization process, according to an example implementation.
Figure 7B:
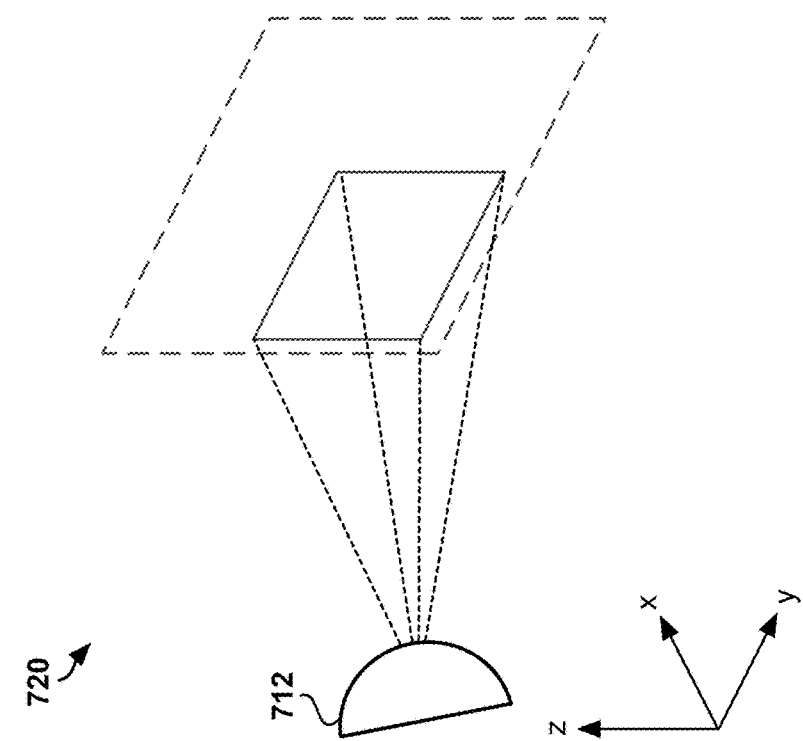

FIG. 7B illustrates a second aspect 720 of an image stabilization process, according to an example implementation. Step 720 may be similar to block 604 as described above. The section 704 may represent a virtual camera tilt selected, controlled, or otherwise received by the computing device. For example, a user or teleoperator wearing a virtual reality headset may turn his or her head down and toward the left; as a result, the section 704 of the image 702 may be located at the lower left of the image 702 (as shown in FIG. 7B). As another example, a user or teleoperator may select the position of the section 704 using an input device. The resulting section 704 of the image 702 represents a narrower angle-of-view than the full image 702.

Figure 7C:
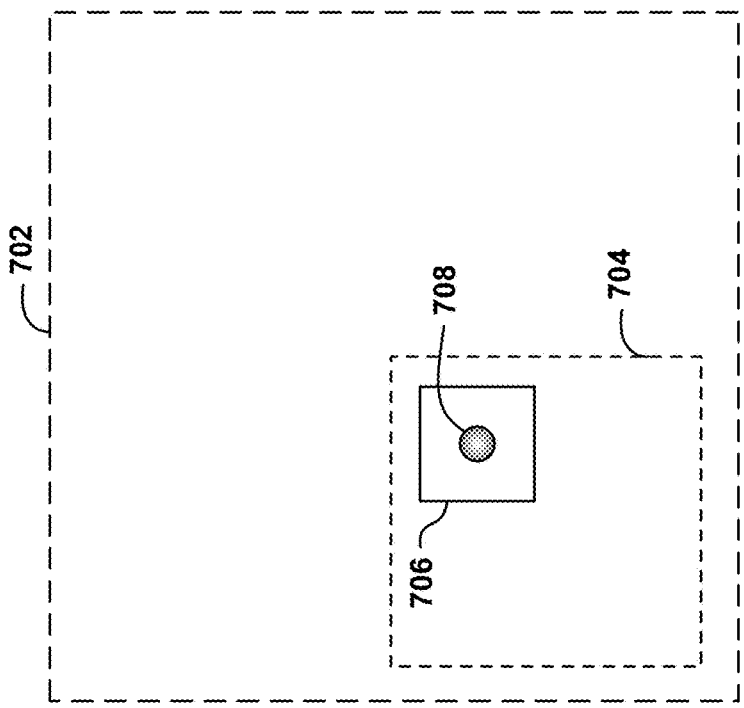
FIG. 7C illustrates a third aspect of an image stabilization process, according to an example implementation.
Figure 7C:
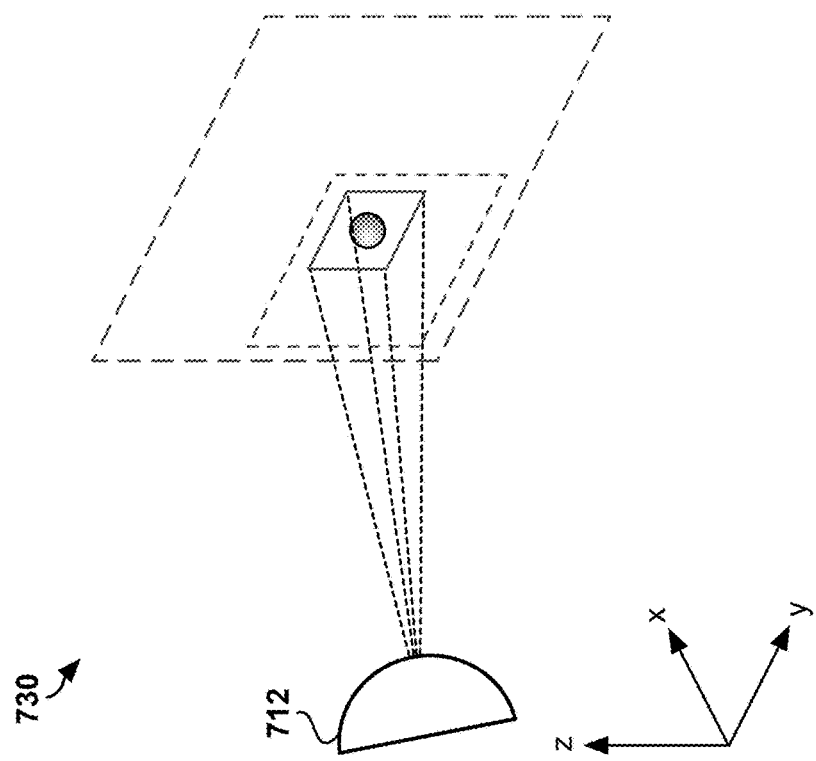

FIG. 7C illustrates a third aspect 730 of an image stabilization process, according to an example implementation. Step 730 may be similar to block 608 as described above. Here, the computing device determines first boundaries 706 around the focusing object 708.

Figure 7D:
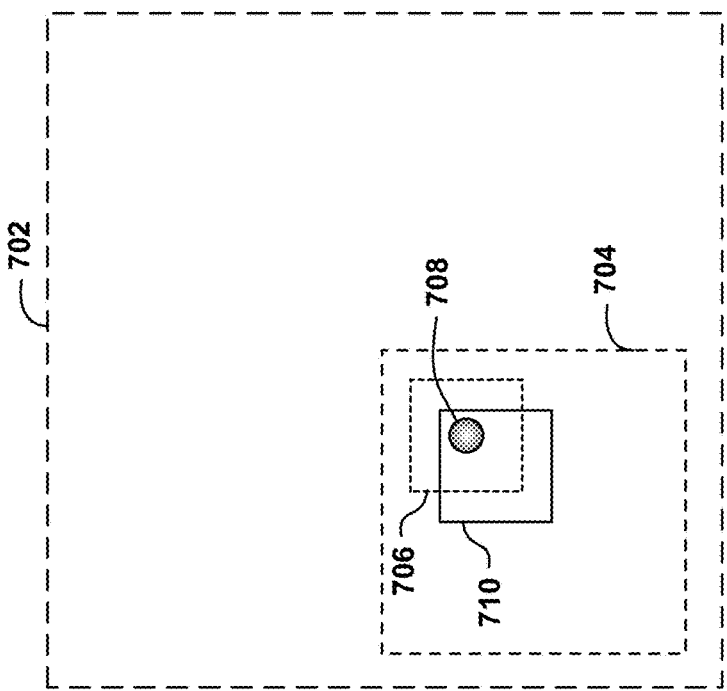
FIG. 7D illustrates a fourth aspect of an image stabilization process, according to an example implementation.
Figure 7D:
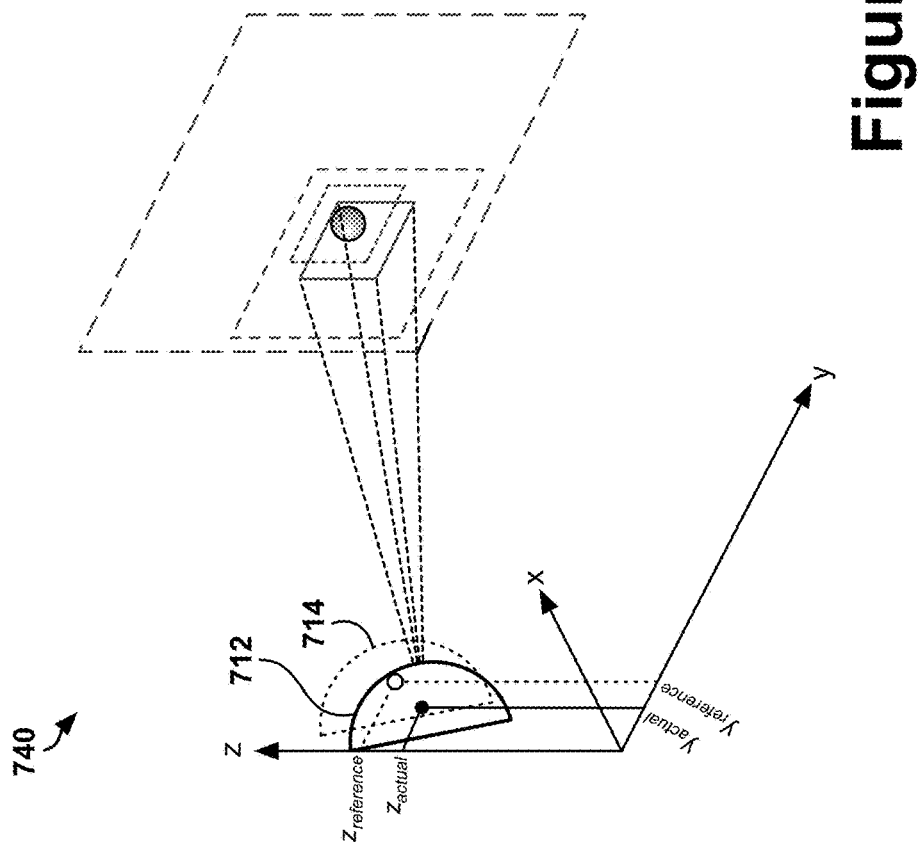

FIG. 7D illustrates a fourth aspect 740 of an image stabilization process, according to an example implementation. Step 740 may be similar to block 610 and block 612 as described above. Here, the camera 712 is shown to have deviated from its reference position 714. As illustrated in FIG. 7D, the reference position 714 of the camera is defined by ($y_{reference}$, $z_{reference}$) while the position of the camera 712 when the image 702 was captured is defined by ($v_{actual}$, $z_{actual}$). In this example, the extent of deviation includes a horizontal displacement equal to $y_{reference} - y_{actual}$ and a vertical displacement equal to $z_{reference} - z_{actual}$. Based on that extent of deviation, the computing device determines the amount by which to shift the first boundaries 706 in order to determined the second boundaries 710.

FIG. 8 illustrates a conceptual top-down view of a robotic step path 800, according to an example implementation. As described herein, image stabilization techniques of the present application involve determining an extent of deviation of a camera's position from a reference position. FIG. 8 illustrates an example process by which the reference position is determined. In the following example, a robotic step path 800 of a biped robot is shown. For the purposes of explanation, the following operations will be described as performed on a control system of the robot; however, the reference position may be calculated, measured, or otherwise determined on other computing devices, circuits, or systems of the robot.

First, the biped robot's left foot is planted at L1 and the right foot is planted at R1. A computing device receives information indicative of these two foot positions and uses those foot positions as a basis for determining the reference line 802. As the camera's position deviates from this reference line 802, the displacement of the camera's position from that reference line may be determined and used during image stabilization operations of the present application. When the feet are at positions L1 and R1, the reference position 804 is the midpoint (or approximately the midpoint) between these two foot positions.

Then, the robot's left foot swings forward and plants at position L2 while the right foot remains planted at R1. When the left foot touches down at L2, the reference position 806 lies at a position on the reference line 802 perpendicular to the foot position L2.

Then, the robot's right foot swings forward and plants at position R2 while the left foot remains planted at L2. The foot position R2 is angled toward the right with respect to the direction of travel. As a result, the computing device determines the reference line 812 based on the angle of the right foot. In this example, the reference line 812 is parallel to the angle of the right foot. When the right foot touches down at R2, the reference position 814 lies at a position on the reference line 812 perpendicular to the foot position R2. This reference position 814 may be a predetermined distance perpendicular to R2. For example, the predetermined distance may be half the width of the robot's default stance (e.g., at a midpoint between the robot's two feet). As another example, the predetermined distance may be half the width of the robot's current stance.

Then, the robot's left foot swings forward and plants at position L3 while the right foot remains planted at R2. The foot position L3 is angled even further toward the right with respect to the direction of travel. As a result, the computing device determines the reference line 822 based on the angle of the recently planted left foot. In this example, the reference line 822 is parallel to the angle of the left foot at L3. When the left foot touches down at L3, the reference position 824 lies at a position on the reference line 822 perpendicular to the foot position L3. This reference position 824 may be at a predetermined distance perpendicular to L3.

In this manner, the computing device may determine the reference position against which it compares the position of the camera, even as the robot's motion includes turning or yaw motion.

Figure 9:
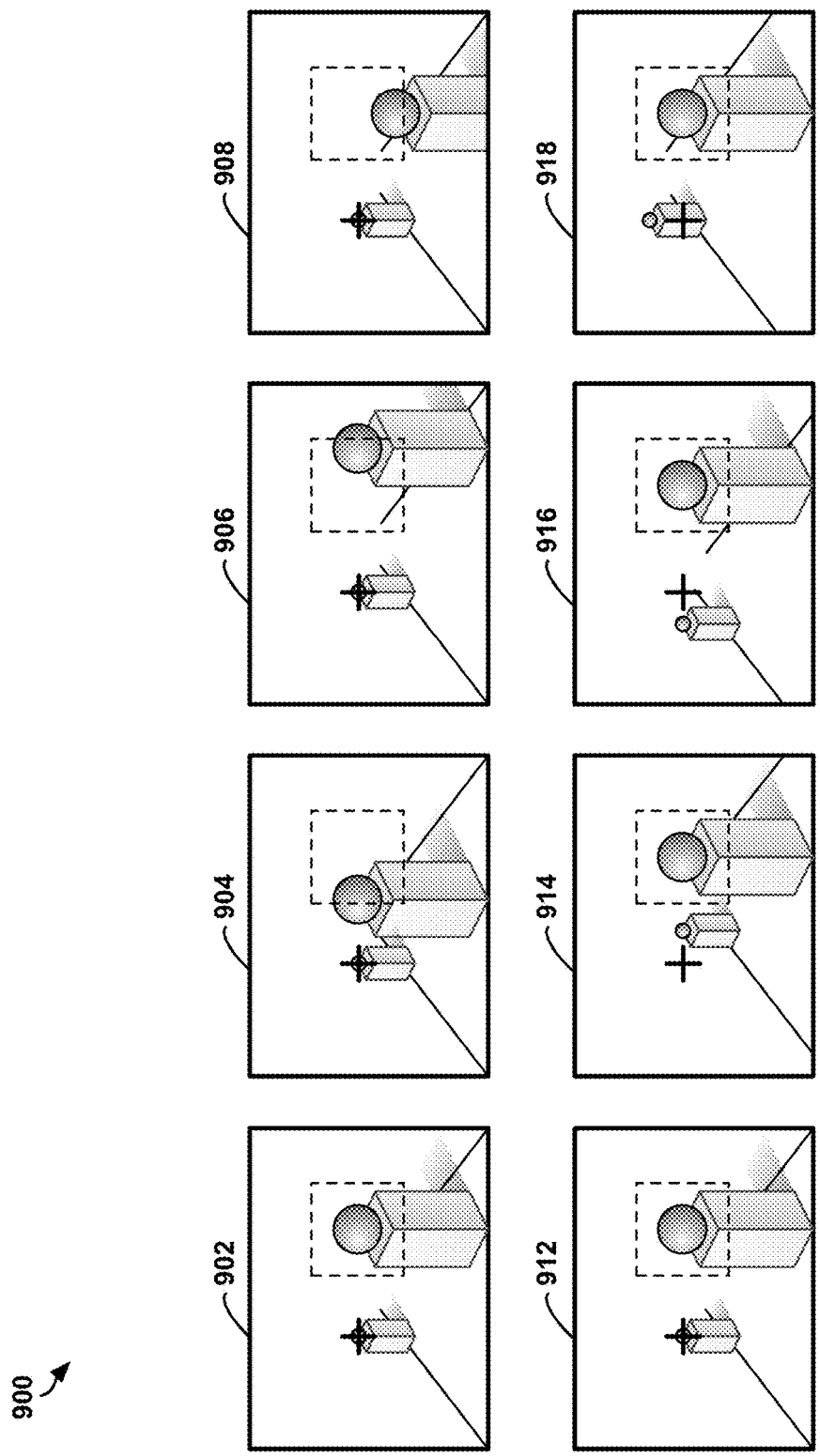
FIG. 9 illustrates two sets of images, according to an example implementation.

FIG. 9 illustrates two sets of images 900, according to an example implementation. The four images along the top of FIG. 9 (images 902, 904, 906, and 908) depict four separate unstabilized images. Images 902-908 may be referred to herein as the "captured images." The four images along the bottom of FIG. 9 (images 912, 914, 916, and 918) depict four separate images stabilized around a foreground object. Images 912-918 may be referred to herein as the "stabilized images" (e.g., cropped, shifted, or otherwise transformed by image stabilization techniques). Vertically aligned images (e.g., image 902 and image 912) represent corresponding images, such that the bottom images represent stabilized versions of the top images. Note that each of the images 902-918 may represent a portion of an entire captured or processed image.

In the images 902-918, the "+" sign and the dotted rectangle are at constant positions among the various images. The example sets of images 900 are provided to depict similarities and differences between unstabilized images and stabilized images within the meaning of the present application.

The images 902-918 are example images captured by a biped robot at different points in time. Image 902 corresponds to image 912, both of which were captured at a first time. Image 904 corresponds to image 914, both of which were captured at a second time. Image 906 corresponds to image 916, both of which were captured at a third time. Image 908 corresponds to image 918, both of which were captured at a fourth time.

At the first time, the robot captures image 902 when in a standing position (e.g., when the camera is at its reference position). At this time, both image 902 and image 912 appear approximately the same.

At the second time, the robot captures image 904 after stepping forward with its left foot, causing the robot's camera (which is coupled to the robot's body) to sway to the right as the robot's body moves to the right to maintain balance. As a result, the foreground object appears to have shifted to the left in the unstabilized image 904, while the background object remains at approximately the same position as it was in image 902. The background object may be any object, surface, or environmental element present within the image at a further distance from the robot than the foreground object. However, in the stabilized image 914, the foreground object appears to remain approximately in the same position as it was in image 912, while the background object appears to have shifted to the right. The stabilized image 914 represents an image resulting from a virtual tilt of the camera that stabilizes around the foreground object, although the background object appears to have moved.

At the third time, the robot captures image 906 after stepping forward with its right foot, causing the robot's camera to sway to the left as the robot's body moves to the left to maintain balance. As a result, the foreground object appears to have shifted to the right in the unstabilized image 906, while the background object remains at approximately the same position as it was in image 902. However, in the stabilized image 916, the foreground object appears to remain approximately in the same position as it was in image 912, while the background image appears to have shifted to the left.

At the fourth time, the robot is at its peak stepping height, causing the robot's camera to sway vertically upwards. As a result, the foreground object appears to have shifted down in the unstabilized image 908, while the background object appears at approximately the same position as it was in image 902. However, in the stabilized image 918, the foreground object appears to remain approximately in the same position as it was in image 912, while the background object appears to have shifted up.

Note that, in this example, the robot maintains balance by shifting its body position to compensate for the foot stepping. As the robot swings its right foot forward, the robot's body is moved to the left to maintain balance. Conversely, as the robot swings its left foot forward, the robot's body is moved to the right to maintain balance. Thus, a right step causes the camera coupled to the robot's body to shift to the left, while a left step causes the camera coupled to the robot's body to shift to the right. Although this type of balancing technique is used in the above-described example, the image stabilization of the present application may be applied to other balancing techniques, gaits, and camera movements.

VII. Example Computer-Readable Medium

Figure 10:
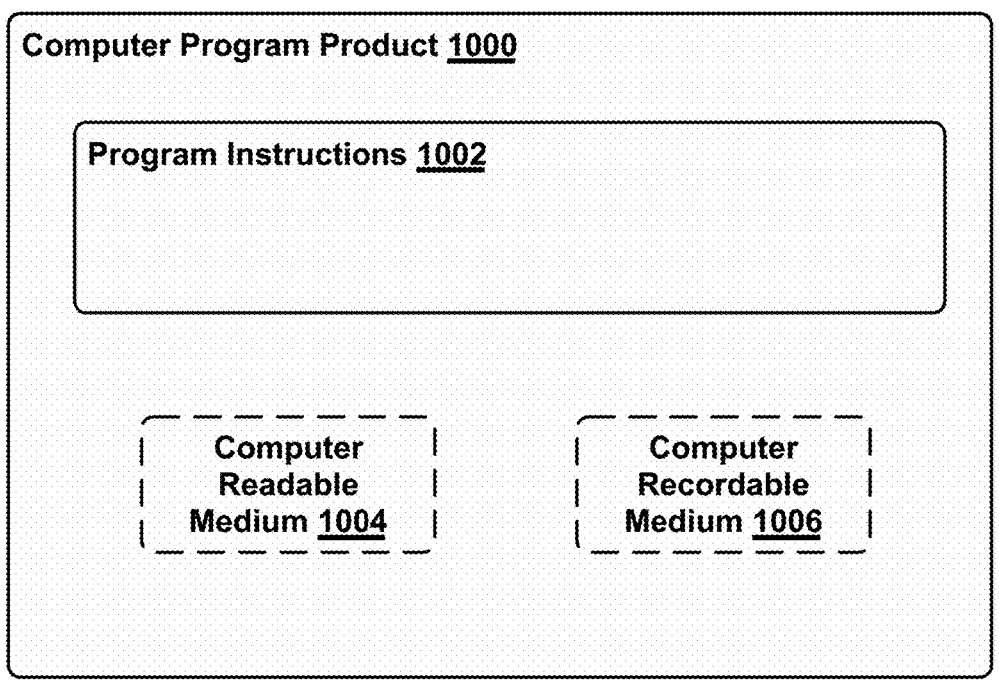
FIG. 10 is a block diagram of an example computer-readable medium, according to an example implementation.

FIG. 10 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 10 is a schematic illustrating a conceptual partial view of a computer program product that includes a computer program for executing a computer process on a computing device, arranged according to at least some implementations disclosed herein.

In some implementations, the example computer program product 1000 may include one or more program instructions 1002 that, when executed by one or more processors may provide functionality or portions of the functionality described above with respect to FIGS. 1-9. In some examples, the computer program product 1000 may include a computer-readable medium 1004, such as, but not limited to, a hard disk drive, a Compact Disc (CD), a Digital Video Disk (DVD), a digital tape, memory, etc. In some implementations, the computer program product 1000 may include a computer recordable medium 1006, such as, but not limited to, memory, read/write (R/W) CDs, R/W DVDs, etc.

The one or more program instructions 1002 can be, for example, computer executable and/or logic implemented instructions. In some examples, a computing device is configured to provide various operations, or actions in response to the program instructions 1002 conveyed to the computing device by the computer readable medium 1004 and/or the computer recordable medium 1006. In other examples, the computing device can be an external device in communication with a device coupled to the robotic device.

The computer readable medium 1004 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 1000 can implement operations discussed in reference to FIGS. 1-9.

VIII. Conclusion

It should be understood that arrangements described herein are for purposes of example only. As such, other arrangements and other elements (e.g. machines, interfaces, operations, orders, and groupings of operations, etc.) can be used instead, and some elements may be omitted altogether. Further, many of the elements that are described may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   obtaining, from an image capture device coupled to a robot, an image of an environment from a perspective of the robot;
   receiving, from a depth sensor coupled to the robot, one or more depth measurements, wherein the depth measurements correspond to locations within the image, and wherein the depth measurements are indicative of distances between the image capture device and a surface in the environment;
   determining first boundaries around a particular location within a section of the image, wherein the particular location corresponds to a particular depth measurement of the one or more depth measurements, and wherein the particular location is approximately centered within the first boundaries;
   determining an extent of deviation of a particular position of the image capture device from a reference position, wherein the particular position is a position of the image capture device at a point in time at which the image was captured;
   determining second boundaries by shifting the first boundaries by an amount proportional to the determined extent of deviation; and
   providing, to a display device, a portion of the image defined by the second boundaries.

2. The method of claim 1, wherein determining the extent of deviation comprises:
   determining the reference position as a position of the image capture device when the robot is in a particular posture;
   determining, based on one or more joint angle measurements, the particular position of the image capture device; and
   determining the extent of deviation by comparing the particular position of the image capture device to the reference position.

3. The method of claim 1, wherein determining the extent of deviation comprises:
   determining the reference position as a position situated at a predetermined height and at a point between two legs of the robot when the robot is in a standing posture;
   determining, based on one or more measurements from an inertial sensor coupled to the robot, the particular position of the image capture device; and
   determining the extent of deviation by comparing the particular position of the image capture device to the reference position.

4. The method of claim 3, wherein the predetermined height is a height of the image capture device with respect to a ground surface when the robot is in a standing posture on the ground surface.

5. The method of claim 3, further comprising:
determining a position of a foot of the robot that was most recently placed on a ground surface; and
determining the point as a predetermined distance from the position of the foot.

6. The method of claim 1, wherein the image represents a first field-of-view of the environment, and wherein the method further comprises:
receiving, from an orientation sensor coupled to a head mounted display, an orientation measurement indicative of an angular position of the head mounted display; and
determining third boundaries within the image that define the section of the image based on the orientation measurement, wherein the third boundaries represent the section of the image having a second field-of-view, and wherein the second field-of-view is contained within the first field-of-view.

7. The method of claim 1, further comprising:
selecting the particular depth measurement as a depth measurement of the one or more depth measurements corresponding to a surface nearest the image capture device within a part of the environment depicted in the section of the image.

8. The method of claim 1, further comprising:
selecting the particular depth measurement as a depth measurement of the one or more depth measurements corresponding to a surface at a predetermined distance from the image capture device within a part of the environment depicted in the section of the image.

9. The method of claim 1, further comprising:
receiving a selection of an object within the environment, wherein the particular location is defined by a location on the object.

10. The method of claim 1, wherein the first boundaries define a first area of a first predetermined size.

11. The method of claim 10, wherein the second boundaries define a second area of a second predetermined size, and wherein the first predetermined size and the second predetermined size are equal.

12. The method of claim 1, wherein the extent of deviation includes a vertical displacement and a horizontal displacement, and wherein determining the second boundaries further comprises:
horizontally shifting the first boundaries by an amount proportional to the horizontal displacement; and
vertically shifting the first boundaries by an amount proportional to the vertical displacement.

13. The method of claim 1, wherein the depth sensor includes a stereoscopic camera.

14. The method of claim 1, wherein the depth sensor includes a LIDAR device.

15. The method of claim 1, wherein the image capture device includes a wide-angle lens, wherein the captured image is distorted, and wherein the method further comprises:
transforming the portion of the image to remove the distortion.

16. A system comprising:
a viewing apparatus comprising an orientation sensor and a display device, wherein the orientation sensor is configured to measure an angular position of the viewing apparatus, and wherein the display device is configured to display images; and
a processing device configured to execute instructions comprising:
selecting a section of an image based on the angular position of the viewing apparatus at a point in time at which the image was captured, wherein the image was captured by an image capture device coupled to a robot;
determining first boundaries around a particular location within the section of the image corresponding to a particular depth measurement of a plurality of depth measurements recorded by a depth sensor coupled to the robot;
determining an extent of deviation of a particular position of the image capture device from a reference position, wherein the particular position is a position of the image capture device at a point in time at which the image was captured;
determining second boundaries by shifting the first boundaries by an amount proportional to the determined extent of deviation; and
causing the display device to display a portion of the section of the image defined by the second boundaries.

17. The system of claim 16, wherein the instructions further comprise:
receiving, from the robot, data indicative of a state of the robot at the point in time at which the image was captured; and
based on the state of the robot, determining the particular position of the image capture device.

18. The system of claim 16, wherein the processing device and the viewing apparatus are communicatively coupled.

19. A non-transitory computer-readable medium having stored thereon instructions that, upon execution by at least one processor, cause a computing device to perform the following operations:
obtaining, from an image capture device coupled to a robot, an image of an environment from a perspective of the image capture device;
receiving, from a depth sensor coupled to the robot, a plurality of depth measurements, wherein depth measurements correspond to locations within the image, and wherein the depth measurements are indicative of distances between the image capture device and a surface in the environment;
determining first boundaries around a particular location within a section of the image, wherein the particular location corresponds to a particular depth measurement of the one or more depth measurements, and wherein the particular location is approximately centered within the first boundaries;
determining an extent of deviation of a particular position of the image capture device from a reference position, wherein the particular position is a position of the image capture device at a point in time at which the image was captured;
determining second boundaries by shifting the first boundaries by an amount proportional to the determined extent of deviation; and
providing data representative of a portion of the section of the image defined by the second boundaries to a teleoperation device.

20. The non-transitory computer-readable medium of claim 19, wherein the operations further comprise:

receiving an orientation measurement from the teleoperation device indicative of an angular position of the teleoperation device; and determining third boundaries within the image that define the section of the image based on the orientation measurement, wherein the third boundaries represent the section of the image having a second field-of-view, and wherein the second field-of-view is contained within the first field-of-view.

\* \* \* \* \*